United States Patent
Harada

(10) Patent No.: US 9,542,943 B2
(45) Date of Patent: Jan. 10, 2017

(54) MINUTES MAKING ASSISTANCE DEVICE, ELECTRONIC CONFERENCE DEVICE, ELECTRONIC CONFERENCE SYSTEM, MINUTES MAKING ASSISTANCE METHOD, AND STORAGE MEDIUM STORING MINUTES MAKING ASSISTANCE PROGRAM

(71) Applicant: NEC Corporation, Tokyo (JP)

(72) Inventor: Chihiro Harada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 155 days.

(21) Appl. No.: 14/497,352

(22) Filed: Sep. 26, 2014

(65) Prior Publication Data

US 2015/0088496 A1   Mar. 26, 2015

(30) Foreign Application Priority Data

Sep. 26, 2013   (JP) ................................ 2013-200131

(51) Int. Cl.
| | |
|---|---|
| G10L 15/26 | (2006.01) |
| H04M 3/42 | (2006.01) |
| H04M 11/10 | (2006.01) |
| G10L 25/78 | (2013.01) |
| H04M 3/56 | (2006.01) |

(52) U.S. Cl.
CPC .......... *G10L 15/26* (2013.01); *H04M 3/42221* (2013.01); *H04M 11/10* (2013.01); *G10L 25/78* (2013.01); *H04M 3/56* (2013.01); *H04M 2201/40* (2013.01); *H04M 2201/60* (2013.01)

(58) Field of Classification Search
CPC ............................ G10L 15/26; H04L 12/1827
USPC .................................................. 704/210, 270
See application file for complete search history.

(56) References Cited

U.S. PATENT DOCUMENTS

| | | | |
|---|---|---|---|
| 8,521,132 B2 * | 8/2013 | Washio ................... | H04M 3/36 455/410 |
| 9,053,640 B1 * | 6/2015 | Hendricks ............... | G06F 17/21 |

FOREIGN PATENT DOCUMENTS

| | | |
|---|---|---|
| JP | 07-123384 | 5/1995 |
| JP | 2004-185514 | 7/2004 |

* cited by examiner

*Primary Examiner* — Susan McFadden
(74) *Attorney, Agent, or Firm* — Young & Thompson

(57) ABSTRACT

A minutes making assistance device according to the present invention includes: a sound processing unit that performs processing regarding a voice and determines whether or not speaking is started; an operation processing unit that performs processing regarding an operation and determines whether or not the operation is performed; a display processing unit that performs processing regarding a display; and a control unit that stores speaking start time and warning time in a memory when the sound processing unit determines that the speaking is started, performs warning processing when the current time becomes the warning time, and terminates the processing when the operation processing unit determines that the operation is performed before the warning time.

13 Claims, 14 Drawing Sheets

Fig.2

| DURING SPEAKING | SPEAKING START TIME(V) | OPERATION FINISH TIME(L) | WARNING TIME(N) |
|---|---|---|---|
| YES | hh:mm:ss | hh:mm:ss | hh:mm:ss |

Fig.7

| TIME | SPEAKING | OPERATION | DURING SPEAKING | SPEAKING START TIME(V) | OPERATION FINISH TIME(L) | WARNING TIME(N) | SUPPLEMENT |
|---|---|---|---|---|---|---|---|
| 1 | NONE | NONE | No | — | — | — | INITIAL STATE |
| 2 | PRESENT | NONE | Yes | 2 | — | 7 | |
| 3 | PRESENT | PRESENT | Yes | — | 3 | — | |
| 4 | PRESENT | PRESENT | Yes | — | — | — | |
| 5 | NONE | PRESENT | Yes | — | — | — | |
| 6 | NONE | NONE | No | — | — | — | |
| 7 | PRESENT | NONE | Yes | 7 | — | 12 | |
| 8 | PRESENT | NONE | Yes | 7 | — | 12 | |
| 9 | PRESENT | NONE | Yes | 7 | — | 12 | |
| 10 | PRESENT | NONE | Yes | 7 | — | 12 | |
| 11 | PRESENT | NONE | Yes | 7 | — | 12 | |
| 12 | — | — | — | 7 | — | 12 | WARNING PROCESSING |

Fig.9

| CONVERSION UPDATE CONTENT | EXTRACTED WORDS | OPERATION UPDATE CONTENT | DURING SPEAKING | SPEAKING START TIME(V) | OPERATION FINISH TIME(L) | WARNING TIME(N) |
|---|---|---|---|---|---|---|
| THERE IS NO PROBLEM IN THE CASE OF PROPOSAL XXX | PROPOSAL XXX PROBLEM | NEXT | YES | hh:mm:ss | hh:mm:ss | hh:mm:ss |

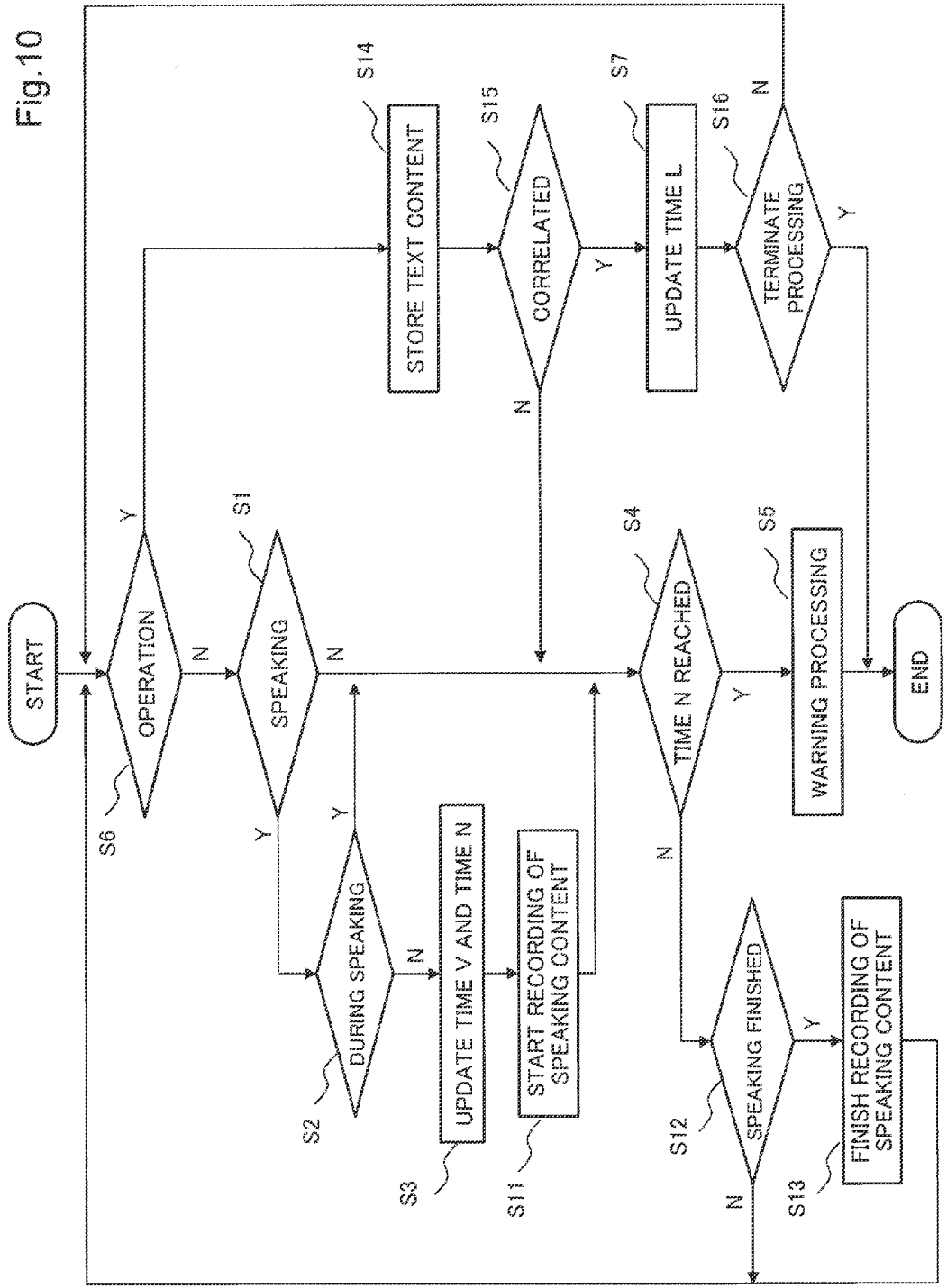

Fig. 11

| TIME | CONVERSION CONTENT | CONVERSION UPDATE CONTENT | EXTRACTED WORD | OPERATION CONTENT | OPERATION UPDATE CONTENT | DURING SPEAK | V | L | N |
|---|---|---|---|---|---|---|---|---|---|
| 1 | --- | --- | --- | --- | --- | No | --- | --- | --- |
| 2 | PROPOSAL AAA | PROPOSAL AAA | PROPOSAL AAA | --- | --- | Yes | 2 | --- | 7 |
| 3 | PRESENTS | PROPOSAL AAA PRESENTS | PROPOSAL AAA | PROPOSAL AAA | PROPOSAL AAA | Yes | 2 | --- | 7 |
| 4 | PROBLEM OF *** | PROPOSAL AAA PRESENTS PROBLEM OF *** | PROPOSAL AAA, *** PROBLEM | --- | PROPOSAL AAA | Yes | 2 | --- | 7 |
| 5 | --- | PROPOSAL AAA PRESENTS PROBLEM OF *** | PROPOSAL AAA, *** PROBLEM | PROBLEM OF *** | PROPOSAL AAA → PROBLEM OF *** | Yes | 2 | 5 | 7 |
| 6 | --- | --- | --- | --- | --- | No | --- | --- | --- |
| 7 | PROPOSAL XXX | PROPOSAL XXX | PROPOSAL XXX | --- | --- | Yes | 7 | --- | 12 |
| 8 | DOES NOT PRESENT | PROPOSAL XXX ··· ANY PROBLEM | PROPOSAL XXX, PROBLEM | --- | --- | Yes | 7 | --- | 12 |
| 9 | ANY PROBLEM | PROPOSAL XXX DOES NOT PRESENT ANY PROBLEM | PROPOSAL XXX, PROBLEM | NEXT | NEXT | Yes | 7 | --- | 12 |
| 10 | BUT SOME TIME FOR PROCESSING | PROPOSAL XXX DOES NOT PRESENT ANY PROBLEM BUT SOME TIME FOR PROCESSING | PROPOSAL XXX, PROBLEM, PROCESSING TIME | CONFERENCE | NEXT CONFERENCE | Yes | 7 | --- | 12 |
| 11 | IS NEEDED | PROPOSAL XXX DOES NOT PRESENT ANY PROBLEM BUT SOME TIME FOR PROCESSING IS NEEDED. | PROPOSAL XXX, PROBLEM, PROCESSING TIME | CANCELLED | NEXT CONFERENCE IS CANCELLED | Yes | 7 | --- | 12 |
| 12 | --- | --- | --- | --- | --- | --- | 7 | --- | 12 |

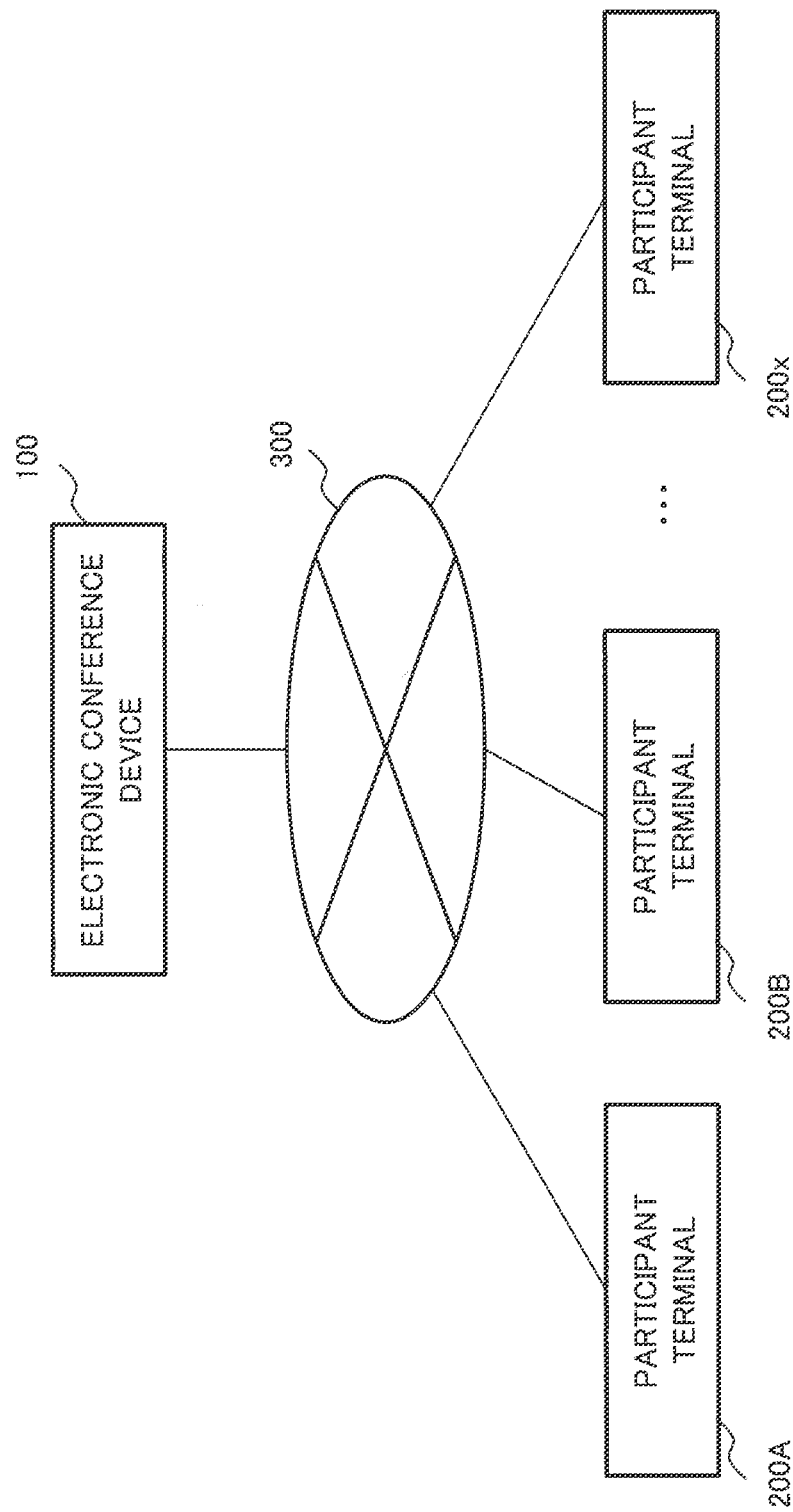

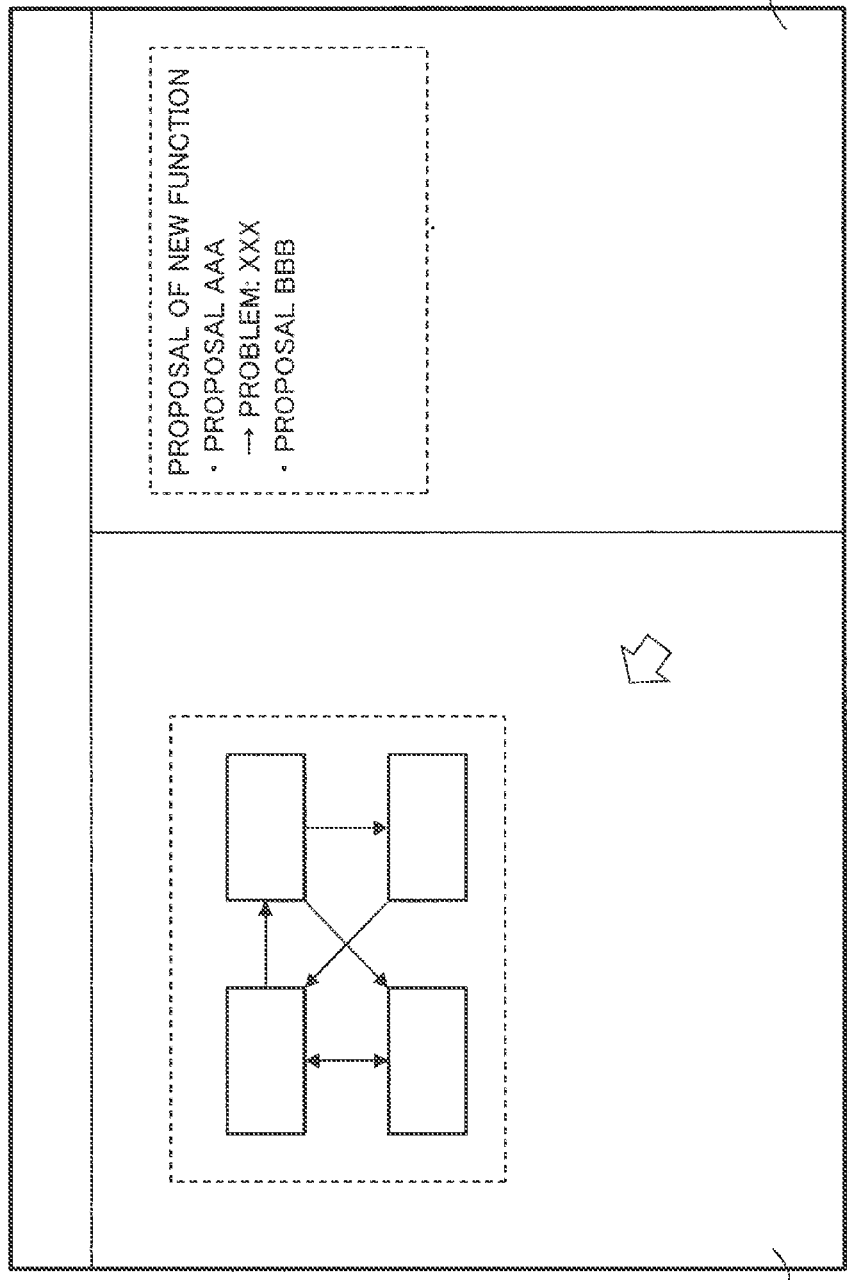

MINUTES MAKING ASSISTANCE DEVICE, ELECTRONIC CONFERENCE DEVICE, ELECTRONIC CONFERENCE SYSTEM, MINUTES MAKING ASSISTANCE METHOD, AND STORAGE MEDIUM STORING MINUTES MAKING ASSISTANCE PROGRAM

This application is based upon and claims the benefit of priority from Japanese Patent Application No. 2013-200131, filed on 26 Sep. 2013, the disclosure of which is incorporated herein in its entirety by reference.

TECHNICAL FIELD

The present invention relates to a minutes making assistance device, an electronic conference device, an electronic conference system, a minutes making assistance method, and a storage medium storing minutes making assistance program.

BACKGROUND ART

In a conference for freely discussing about a subject for discussion, such as a conference for examining the features of a new product, a plurality of participants meet in one place such as a conference room, explain and summarize their opinions utilizing a whiteboard and the like.

Patent Literature 1 discloses a voice recording device, a voice recording method, a voice recording program, and a recording medium, which record voice data, display the recorded voice data with input character data and image data on a screen, and record selected voice data in association with the character data and the image data.

Moreover, a multipoint electronic conference is performed through communication network. Patent Literature 2 discloses a multimedia minutes making device which reproduces voice data which is recorded with captured video data, input text data and the like according to operations of record start and stop in an electronic conference, and edits the data to make the minutes.

PRIOR ART DOCUMENTS

Patent Literatures

Patent Literature 1: Japanese Unexamined Patent Publication No. 2004-185514
Patent Literature 2: Japanese Unexamined Patent Publication No. H07-123384

SUMMARY

An exemplary object of the invention is to provide a minutes making assistance device, an electronic conference device, an electronic conference system, a minutes making assistance method, and a storage medium storing a minutes making assistance program, which make minutes of conference with small data volume and warn when failing to write contents of proceedings.

A minutes making assistance device according to an exemplary aspect of the invention includes: a sound processing unit that performs processing regarding a voice and determines whether or not speaking is started; an operation processing unit that performs processing regarding an operation and determines whether or not the operation is performed; a display processing unit that performs processing regarding a display; and a control unit that stores speaking start time and warning time in a memory when the sound processing unit determines that the speaking is started, performs warning processing when current time becomes the warning time, and terminates the processing when the operation processing unit determines that the operation is performed before the warning time.

A minutes making assistance method according to an exemplary aspect of the invention includes: a voice processing that performs processing regarding a voice and determines whether or not speaking is started; an operation processing that performs processing regarding an operation and determines whether or not the operation is performed; a display processing that performs processing regarding a display; and a controlling that stores speaking start time and warning time in a memory when it is determined in the voice processing that the speaking is started, performs warning processing when current time becomes the warning time, and terminates the processing when the operation processing unit determines that the operation is performed before the warning time.

A storage medium storing a minutes making assistance program for causing a computer according to an exemplary aspect of the invention to execute: a voice processing that performs processing regarding a voice and determines whether or not speaking is started; an operation processing that performs processing regarding an operation and determines whether or not the operation is performed; a display processing that performs processing regarding a display; a control processing that stores speaking start time and warning time in a memory when it is determined in the voice processing that the speaking is started, performs warning processing when current time becomes the warning time, and terminates the processing when the operation processing unit determines that the operation is performed before the warning time.

BRIEF DESCRIPTION OF THE DRAWINGS

Exemplary features and advantages of the present invention will become apparent from the following detailed description when taken with the accompanying drawings in which:

FIG. 2 is a diagram illustrating an example of stored data;
FIG. 7 is a diagram illustrating an example of stored data;
FIG. 9 is a diagram illustrating an example of stored data;
FIG. 10 is a flowchart illustrating an example of processing in an exemplary embodiment;
FIG. 11 is a diagram illustrating an example of stored data;
FIG. 12 is a diagram illustrating a schematic configuration example of a system in the present invention;
FIG. 13 is a diagram illustrating an example of a display screen.

EXEMPLARY EMBODIMENT

Next, a detailed explanation will be given for a first exemplary embodiment with reference to the drawings.

It is noted that, in the exemplary embodiments, preferable limitation in technical aspect will be given to implement the present invention, which does not limit the scope of the invention.

As an application example of the present invention relating to a minutes making assistance device, an electronic conference system will be described.

The first exemplary embodiment of the present invention will be described.

Figure 1:
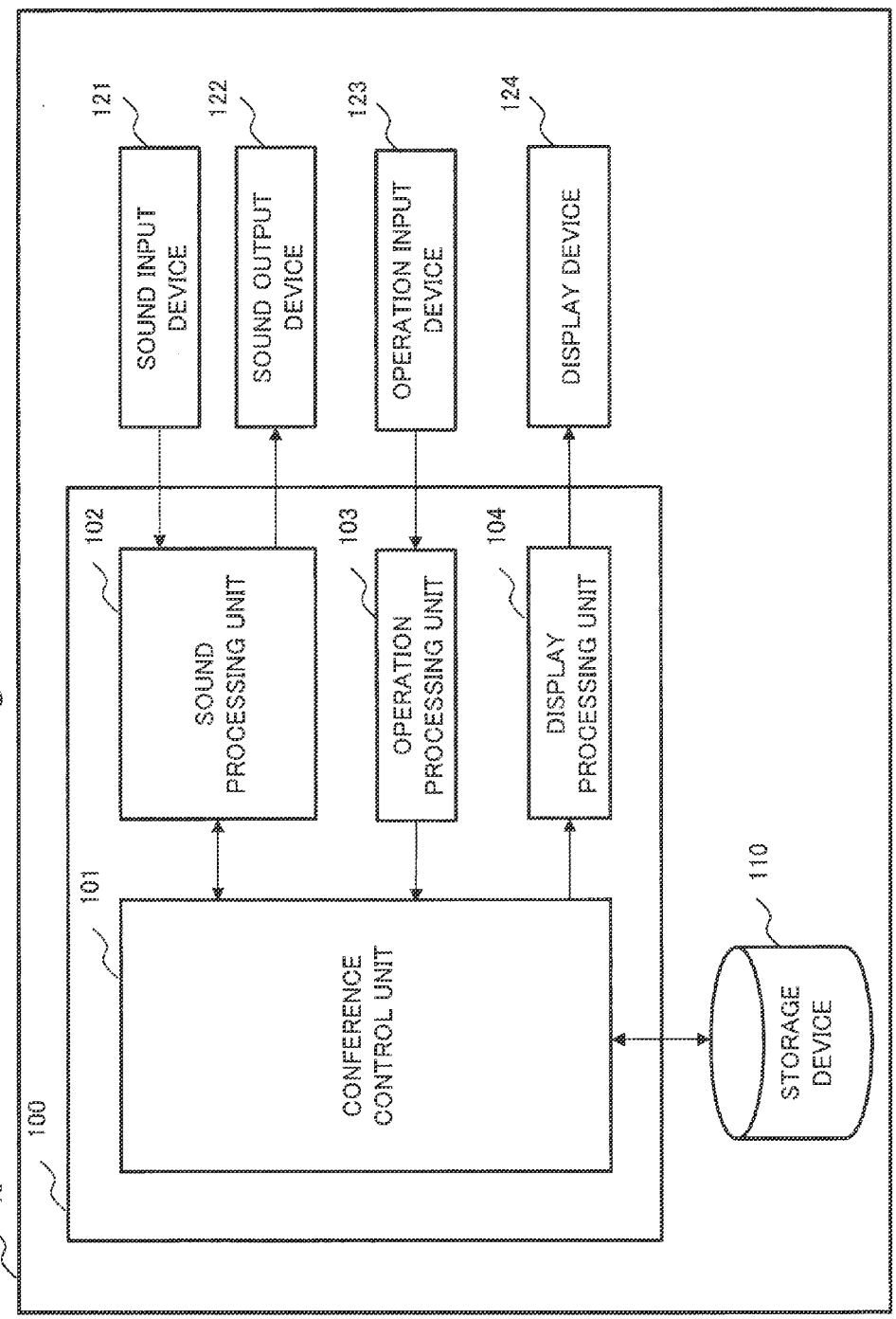
FIG. 1 is a diagram illustrating a schematic configuration example of a system in the present invention.

FIG. 1 is a block diagram illustrating a schematic configuration example of an electronic conference system according to the first exemplary embodiment.

An electronic conference system 10 includes an electronic conference device 100, a storage device 110, a sound input device 121, a sound output device 122, an operation input device 123, and a display device 124.

The electronic conference device 100 is a personal computer, a server, or the like, for example, and includes a conference control unit 101, a sound processing unit 102, an operation processing unit 103, and a display processing unit 104.

The conference control unit 101 controls each of units of the electronic conference device 100 including the sound processing unit 102, the operation processing unit 103 and the display processing unit 104, and each unit of the electronic conference system 10. When the sound processing unit 102 determines that speaking is started, the conference control unit 101 stores speaking start time (V) and warning time (N) in the storage device 110. Further, the conference control unit 101 performs warning processing when the current time becomes the warning time (N). When the operation processing unit 103 determines that the operation is performed with the operation input device 123 before the warning time (N) comes, the conference control unit 101 updates operation finish time (L) and terminates the processing.

The sound processing unit 102 performs processing regarding the voice input from the sound input device 121 and the voice to be output from the sound output device 122. The sound processing unit 102 determines whether or not speaking starts (speaking is started), and whether or not it is during speaking (speaking is being continued), based on the voice data according to the voice input from the sound input device 121. The sound processing unit 102 determines that speaking is started, for example, when a magnitude of voice amplitude reaches a predetermined magnitude according to the voice data. Then, the sound processing unit 102 determines that speaking is continued when the voice amplitude falls below the predetermined magnitude and then, reaches the predetermined magnitude again within a predetermined time period. Further, the sound processing unit 102 determines that speaking is finished when predetermined time elapses after the voice amplitude has fallen below the predetermined magnitude. In other words, the sound processing unit 102 determines that speaking is not continued. It is noted that the conference control unit 101 may be configured to determine whether or not the speaking is started and whether or not speaking is continued.

The operation processing unit 103 performs processing regarding the operation performed with the operation input device 123. For example, when the operation input device 123 is a keyboard, the operation processing unit 103 recognizes characters and text which are input according to the operation with the keyboard. When the operation input device 123 is a mouse, the operation processing unit 103 recognizes the processing according to the operation performed with the mouse.

The display processing unit 104 performs processing regarding a display on the display device 124. The display processing unit 104 notices that writing proceedings of the conference is forgotten, in accordance with an instruction from the conference control unit 101, for example, by causing a message display, an icon display, or a blink indication on the display device 124, causing a change of the displayed color, or combining these matters.

The storage devices 110 may be, for example, a hard disk, a memory, or the like, and may be embedded in the electronic conference device 100 or may be externally provided.

Hereinafter, the data stored in the storage device 110 will be described.

Figure 3:
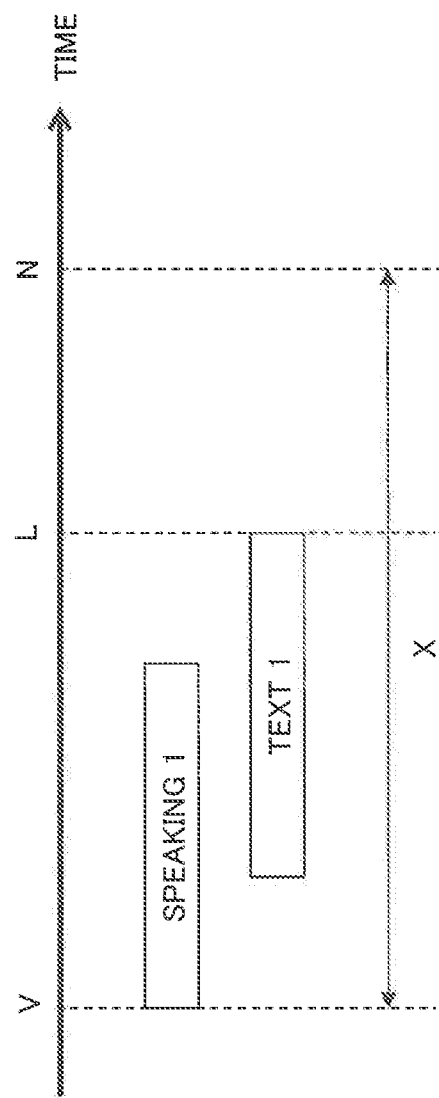
FIG. 3 is a diagram illustrating an example of a user's action.

FIG. 2 illustrates an example of the data which is stored in the storage device 110 and managed by the conference control unit 101, and FIG. 3 is a conceptual diagram in which a horizontal axis represents time.

In a field of during speaking illustrated in FIG. 2, a determination result of whether or not speaking is continued determined by the sound processing unit 102 is illustrated.

In a field of speaking start time (V) illustrated in FIG. 2, the time when the sound processing unit 102 determines that speaking is started is illustrated.

In a field of operation finish time (L) illustrated in FIG. 2, the time when the operation processing unit 103 determines that an operation inputting a character or text is performed with the operation input device 123 is illustrated.

The time illustrated in the field of the warning time (N) in FIG. 2 is decided from the warning time (X) and the speaking start time (V) illustrated in FIG. 3. The warning time (X) is set in advance and stored in the storage device 110.

For example, the sound input device 121 may be a microphone or the like, can install an ON/OFF switch, and may be plural.

For example, the sound output device 122 may be a speaker or the like, and may be embedded in the electronic conference device 100.

The operation input device 123 is a keyboard, a mouse, a touch panel, or the like, for example.

Figure 4:
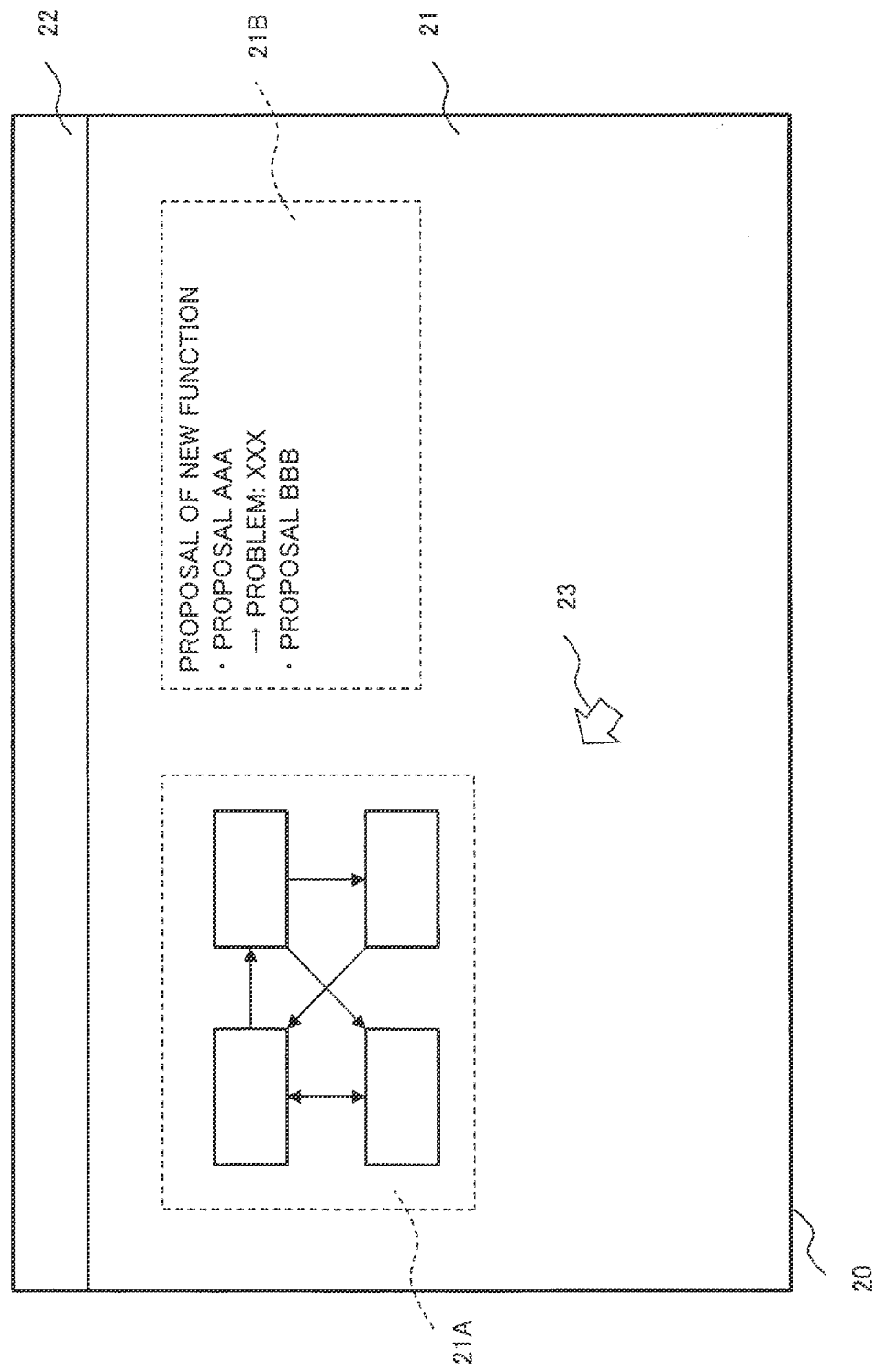
FIG. 4 is a diagram illustrating an example of a display screen.

The display device 124 is a liquid crystal display or the like, for example. FIG. 4 is an explanatory diagram illustrating an example of a screen displayed on the display device 124. On a screen 20 of the display device 124, a workspace 21, a tool bar 22, and a mouse cursor 23 are displayed. When the operation input device 123 is operated, the conference control unit 101 displays an image 21A and text 21B on the workspace 21 through the display processing unit 104. The image 21A illustrated in FIG. 4 is an example of a figure input into the conference control unit 101 through the operation input device 123 during a conference. The text 21B illustrated in FIG. 4 is an example of the text which is input into conference control unit 101 through the sound input device 121 during the conference and which the conference control unit 101 has determined that the operation input device 123 is operated in response to speaking.

It is noted that two or more devices among the sound input device 121, the sound output device 122, the operation input device 123, and the display device 124 may be combined.

Multiple devices having functions similar to each other may be connected to the electronic conference device 100.

Next, an operation of the electronic conference device 100 in the present exemplary embodiment will be described.

Figure 5:
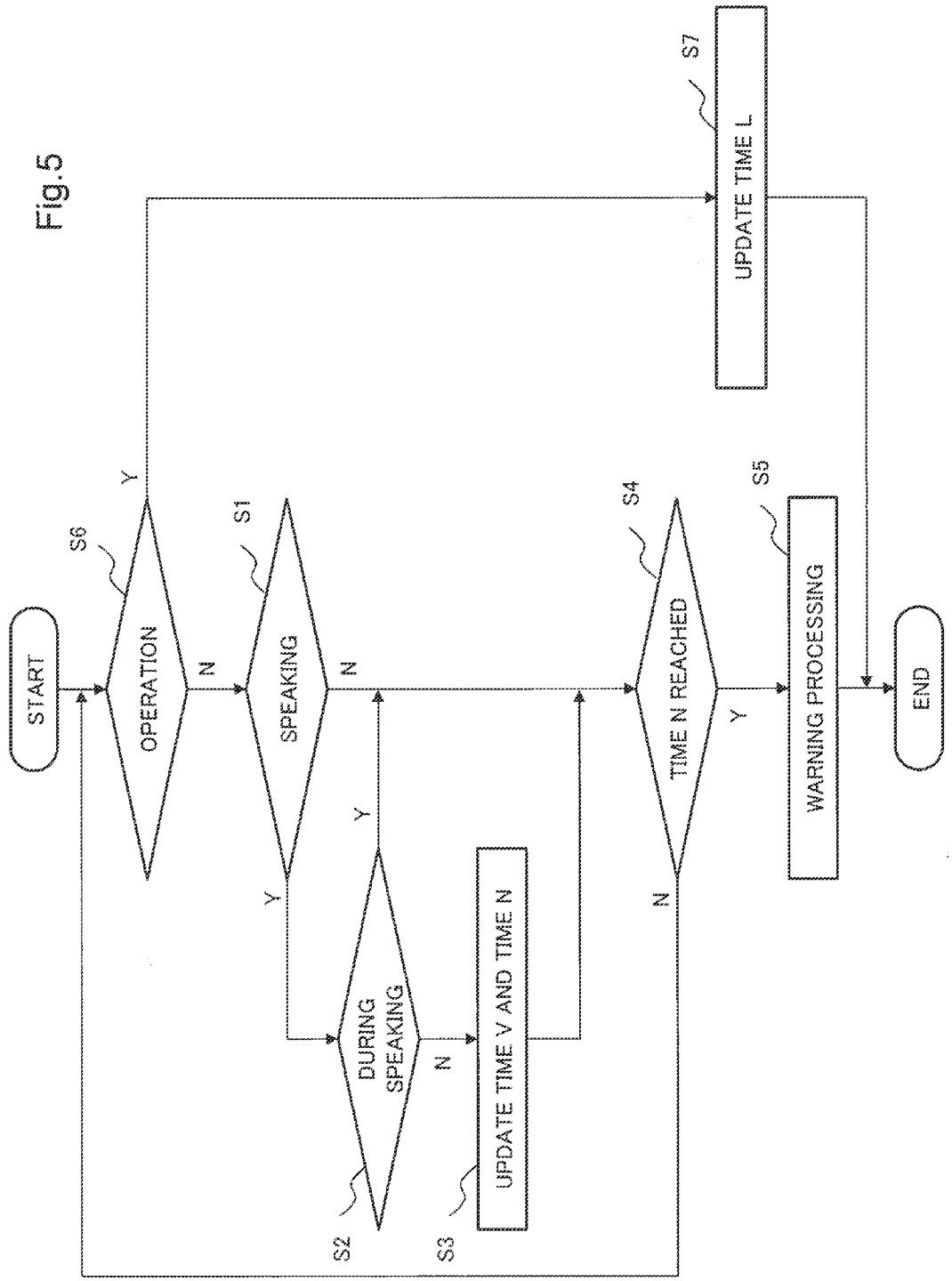
FIG. 5 is a flowchart illustrating an example of processing in an exemplary embodiment.

FIG. 5 is a flowchart illustrating an example of processing in the present exemplary embodiment.

The conference control unit 101 performs the subsequent processing, when no operation is performed with the operation input device 123 (N in S6), and when the sound processing unit 102 determines that speaking is started.

When the sound processing unit 102 determines that speaking is started but the speaking is not continued (Y in S1, N in S2), the conference control unit 101 determines that speaking is started, and updates the speaking start time (V) and the warning time (N) (S3). On the other hand, when the sound processing unit 102 determines that speaking is started and the speaking is continued (Y in S1, Y in S2), the conference control unit 101 does not update the speaking start time (V) and the warning time (N).

When the current time becomes the warning time (N) (Y in S4), the conference control unit 101 performs the warning processing (S5). Then, when a cancel operation is performed, the conference control unit 101 stops the warning processing to terminate the processing. When the operation processing unit 103 determines that an operation is performed before the current time becomes the warning time (N) (N in S4, Y in S6), the conference control unit 101 updates the operation finish time (L) (S7), and terminates the processing.

Figure 6:
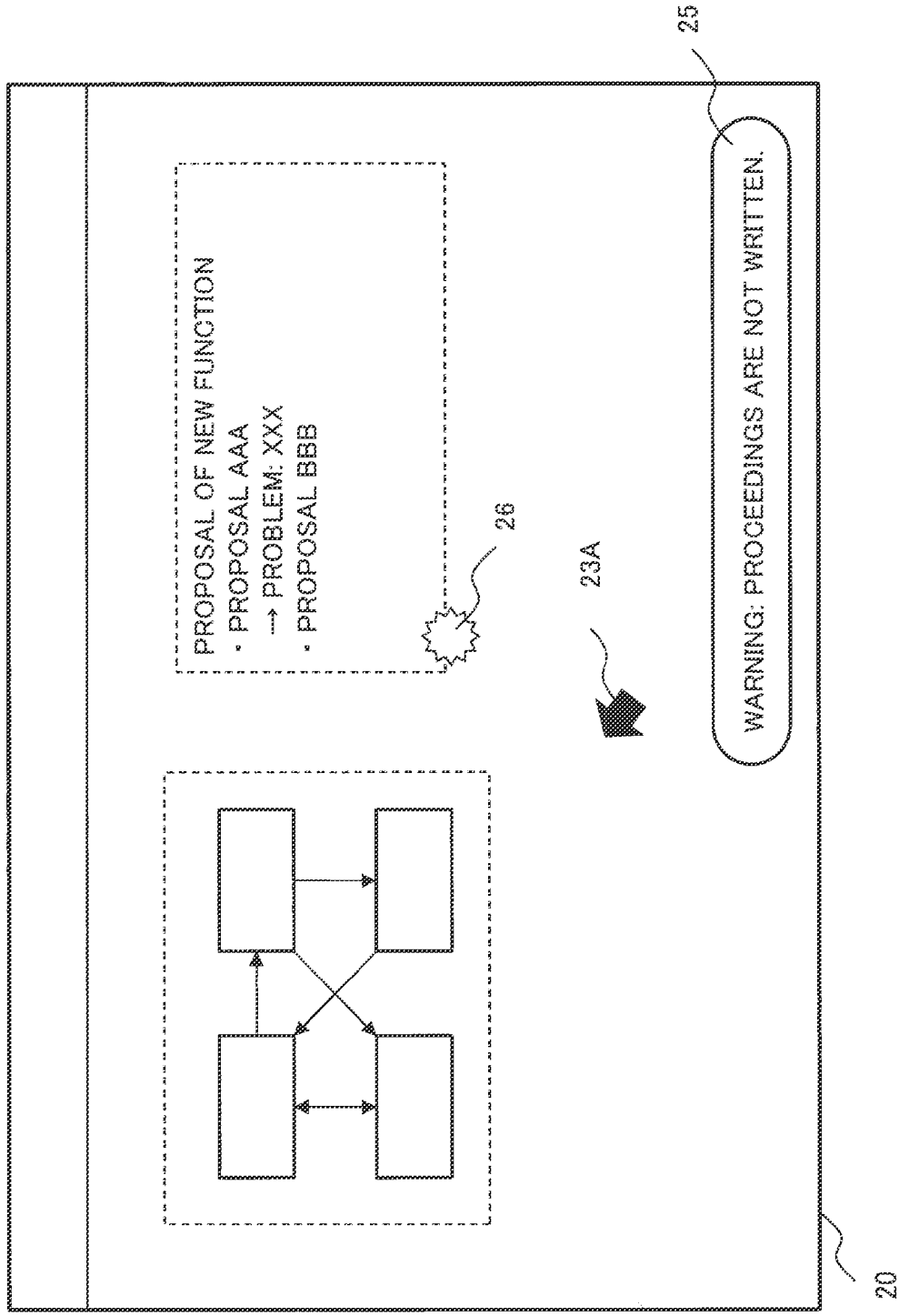
FIG. 6 is a diagram illustrating an example of a display screen.

The warning processing is any of the following processes, for example: (1) causing an emission of an alarm from the sound output device 122; (2) causing a change of a shape of a mouse cursor displayed on the display device 124; (3) causing a display of a message or an icon; (4) causing a change of a part or whole of the colors on a screen; (5) causing a blinking of a part or whole of a screen; and (6) combining two or more of the above-described matters (1) to (5). FIG. 6 is an explanatory diagram illustrating an example of the screen when the warning processing has been performed. In the example illustrated in FIG. 6, a mouse cursor 23A with changed color, a message 25 indicating that writing proceedings are forgotten, and an icon 26 are displayed.

Hereinafter, transition of the data managed by the conference control unit 101 will be described.

FIG. 7 illustrates an example of the transition of data with respect to the determinations made by the sound processing unit 102 and the operation processing unit 103 in order of the time series with constant time interval. A numerical value corresponding to each time represents the relative time for convenient. For example, 09:00:01 is represented by "1", and 09:00:07 is represented by "7". The warning time (N) is set according to the speaking start time (V), when the warning time (X) is assumed to be a time interval "5".

In FIG. 7, the determination results by the sound processing unit 102 are illustrated in a field of speaking and a field of during speaking.

In FIG. 7, the determination result by the operation processing unit 103 is illustrated in a field of operation.

In the example illustrated in FIG. 7, for example, operation finish time (L) is updated since an operation of inputting a character is performed at time "3", and no operation is performed in response to the speaking at time "2" to "4" after time "4". In addition, in the example illustrated in FIG. 7, at time "7", the speaking start time (V) and the warning time (N) are updated since the sound processing unit 102 has determined that speaking is started. Since the warning time (N) comes at time "12", the conference control unit 101 performs the warning processing.

According to the present exemplary embodiment, the warning processing is performed when no operation is made using the operation input device 123 within predetermined time since speaking is started. Therefore, according to the present exemplary embodiment, it is possible to suppress forgetting to write the contents of proceedings.

Next, a second exemplary embodiment will be described.

Figure 8:
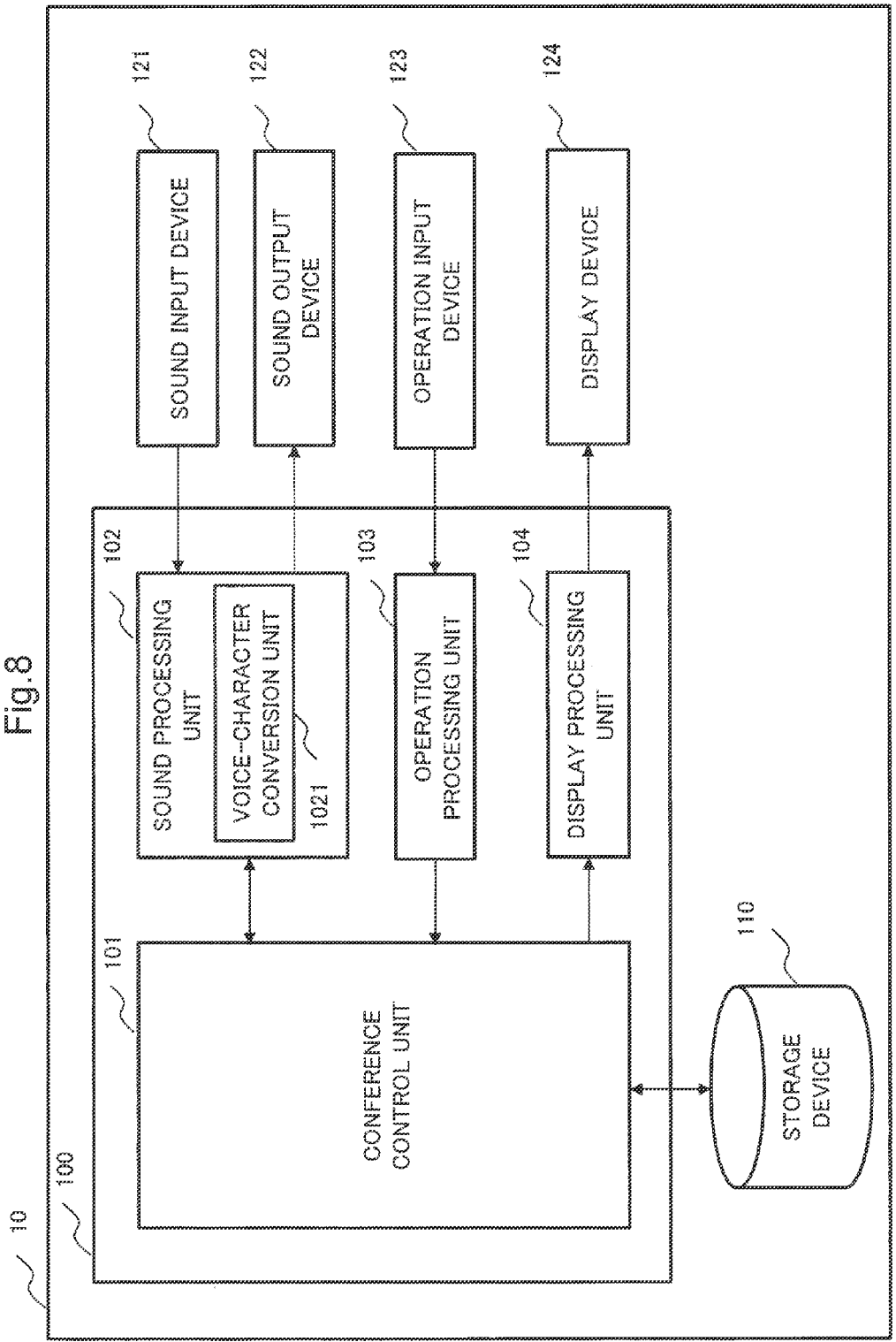
FIG. 8 is a diagram illustrating a schematic configuration example of the system in the present invention.

FIG. 8 is a drawing illustrating a schematic configuration example of an electronic conference device according to the second exemplary embodiment.

In the electronic conference device 100 of the present exemplary embodiment, a voice-character conversion unit 1021 is added to the electronic conference device 100 according to the first exemplary embodiment illustrated in FIG. 1, and the contents described below are also added as the management data.

FIG. 9 is an explanatory diagram illustrating an example of data stored in the storage device 110 to manage the data by the conference control unit 101.

In the management data of FIG. 9, a conversion update content which the voice-character conversion unit 1021 has converted the voice into the text for an update, further, extracted words from the conversion update content, and an operation update content regarding an update of an operation content are added to the data illustrated in FIG. 2.

Next, an operation of the electronic conference device 100 according to the second exemplary embodiment will be described.

FIG. 10 is a flowchart illustrating an example of processing in the present exemplary embodiment.

In the present exemplary embodiment, processing from step S11 to step S16 is added to the processing in the first exemplary embodiment. Therefore, the processing from step S11 to step S16 will be described.

When the sound processing unit 102 determines that speaking is started, the conference control unit 101 updates speaking start time and warning time, and begins to store contents of speaking into a storage device 110 (S11).

The conference control unit 101 performs warning processing when the current time becomes the warning time, as in the processing of the first exemplary embodiment, and stops the warning processing and terminates the processing when a cancel operation is performed.

When the sound processing unit 102 determines that speaking is finished before the current time becomes the warning time (N in S4, Y in S12), the conference control unit 101 finishes storing the contents of speaking (S13).

When the operation processing unit 103 determines that an operation is performed before the current time becomes the warning time, the conference control unit 101 stores the contents of a text which is input according to the performed operation into the storage device 110 (S14). Then, the conference control unit 101 determines whether or not the stored content of text is correlated to the text converted from the voice by the voice-character conversion unit 1021 (S15). When it is determined that the content is correlated to the text (Y in S15), the conference control unit 101 updates operation finish time (L). When it is determined that the content is not correlated to the text (N in S15), the conference control unit 101 waits subsequent text to be input according to an operation, accumulates the texts by the end of the processing, and continues to update the operation finish time (L). Further, the conference control unit 101 may extract words from the text converted from the voice, and may determine the presence or absence of correlation between the extracted words and the text input according to an operation. Publicly known methods may be used for determining the correlation. For example, a degree of correlation is represented by a numerical value from 0 to 1.0, and it is determined that the extracted words and the text input are correlated to each other when the degree of correlation therebetween exceeds a certain threshold.

When the operation finish time (L) is updated, the conference control unit 101 displays a selection screen for selecting whether to terminate processing or not on the display device 124 through the display processing unit 104. The conference control unit 101 terminates the processing when termination of processing is selected by an operation performed with the operation input device 123 (S16), and waits for an input of a text when the termination of processing is not selected. Step S16 is preferably provided, but it can be omitted.

Hereinafter, transition of the managed data will be described.

FIG. 11 illustrates an example of the transition of data with respect to the determinations made by the sound processing unit 102 and the operation processing unit 103 in order of the time series with constant time interval.

In a field of conversion content in FIG. 11, a content of a text converted from speaking of a user in each instant of time is illustrated.

In a field of conversion update content in FIG. 11, a content that a text content converted from the speaking of the user is repeatedly updated until it is determined that speaking is finished is illustrated.

In a field of operation content and a field of operation update content in FIG. 11, a content that is input according to an operation in each instant of time and a content repeatedly updated are illustrated, respectively.

For example, since time to determine whether or not speaking is finished has not elapsed at time "5", the field corresponding to time "5" illustrates "during speaking", and it is illustrated that the operation finish time (L) is updated since it is determined that the conversion update content is correlated to the operation update content, and that the processing for the speaking at time "2" to "4" has terminated. At time "9" to "11", since wrong contents are input according to operations, a condition without any correlation with respect to the speaking in time "7" to "11" is continued. Then, at time "12", since the warning time comes, the conference control unit 101 performs the warning processing.

According to the present exemplary embodiment, an effect which is the same or similar to the effect in the first exemplary embodiment can be achieved. In the present exemplary embodiment, the presence or absence of correlation between the voice processing result by the sound processing unit 102 and the text input according to an operation performed with the operation input device 123 is determined. Then, the warning processing is performed when the determination result of no correlation therebetween has continued by the predetermined time. Therefore, according to the present exemplary embodiment, record of the wrong contents of proceedings can be suppressed.

Next, a third exemplary embodiment will be described.

As illustrated in FIG. 12, a multipoint electronic conference system can be configured by connecting respective participant terminals 200 to the present electronic conference device 100 through a communication network 300.

Each of the participant terminals 200 is a personal computer, a tablet terminal, or the like, which is connectable with the electronic conference device 100 through the communication network 300, and includes a sound input device 121 and a sound output device 122. Each of the participant terminals 200 may include one or more of a sound processing unit 102, an operation processing unit 103, and a display processing unit 104, and may further include a voice-character conversion unit 1021.

The communication network 300 is the Internet, intranet, or a combination thereof.

As have been described above, according to each exemplary embodiment of the present invention, data volume for storing can be reduced since voice data is converted into text. In addition, warning is issued when writing contents of proceedings is forgotten. Therefore, forgetting to write the contents of proceedings can be suppressed.

As exemplified in FIG. 13, a screen 20 of the display device 124 is divided into a workspace 21 and a minutes area 24, whereby only minutes area 24 can be used as an object of operation and comparison. In other words, an input operation and a comparison of the texts which are not directly related to the contents of proceedings are avoidable, and the determination accuracy of correlation between the text and voice data converted into text can be improved. The minutes area 24 may be an input field provided in the workspace 21, a dedicated screen for minutes provided independently, or an input field or area designated by a user. Alternatively, the minutes area 24 may be an input field or area set by the conference control unit 101 on the basis of text content or history, or the like. The input field or area and the dedicated screen for the minutes may be provided in plural.

Figure 14:
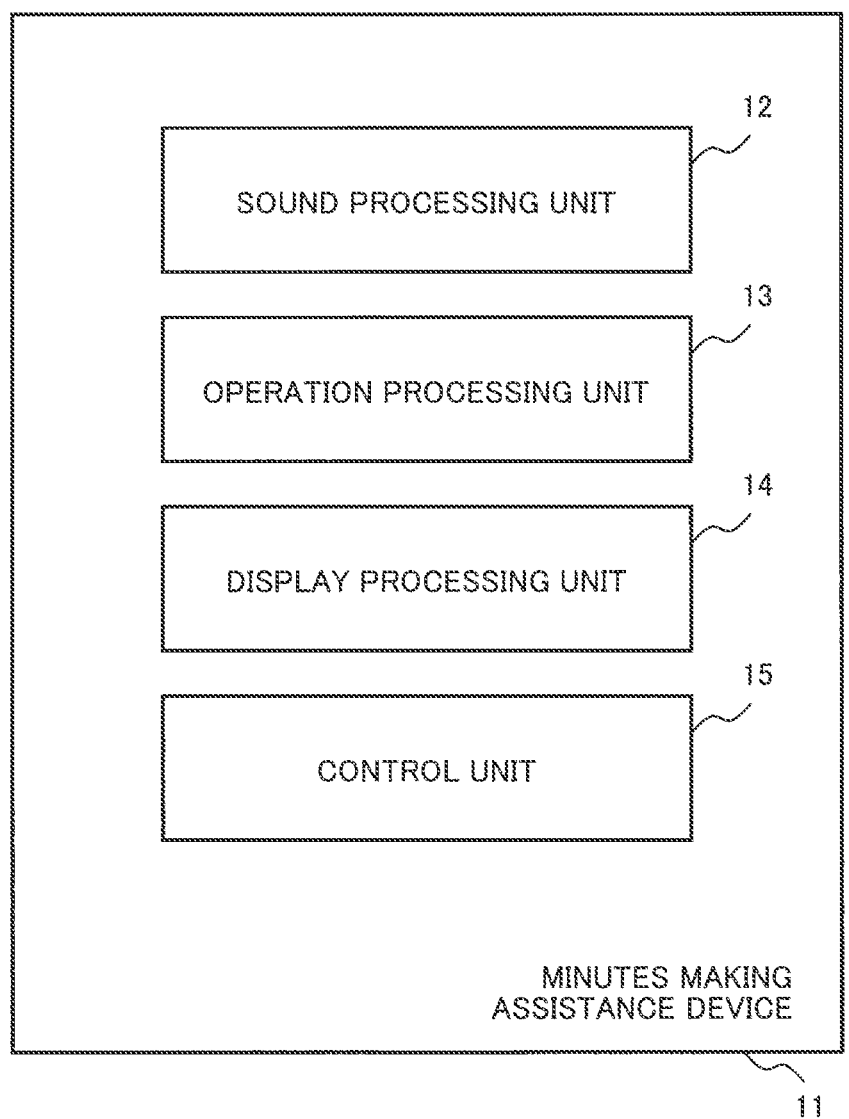
FIG. 14 is a block diagram illustrating the configuration example of a fourth exemplary embodiment.

Next, a fourth exemplary embodiment of the present invention will be described. FIG. 14 is a block diagram illustrating a configuration example of a minutes making assistance device 11 according to the fourth exemplary embodiment of the present invention. As illustrated in FIG. 14, the minutes making assistance device 11 according to the fourth exemplary embodiment of the present invention includes a sound processing unit 12, an operation processing unit 13, a display processing unit 14, and a control unit 15.

The sound processing unit 12 performs processing regarding a voice and determines whether or not speaking is started. The operation processing unit 13 performs processing regarding an operation and determines whether or not the operation is performed. The display processing unit 14 performs processing regarding a display. The control unit 15 stores speaking start time and warning time in a memory (which corresponds to the storage device 110 illustrated in FIG. 1) when the sound processing unit 12 determines that speaking is started, performs warning processing when the current time becomes the warning time, and terminates the processing when the operation processing unit 13 determines that the operation is performed before the warning time.

The sound processing unit 12 corresponds to the sound processing unit 102 illustrated in FIG. 1. The operation processing unit 13 corresponds to the operation processing unit 103 illustrated in FIG. 1. The display processing unit 14 corresponds to the display processing unit 104 illustrated in FIG. 1. The control unit 15 corresponds to the conference control unit 101 illustrated in FIG. 1.

According to the present exemplary embodiment, data volume can be made small and forgetting to write the contents of proceedings can be suppressed.

The related art described in the background art causes a problem, such as the conference advances without the discussion summary, the decided matter, and the like being recorded, and these are not written to a whiteboard or the like when lively discussion is conducted, since there are many verbal utterances in a conference. The device described in Patent Literature 1 and the device described in Patent Literature 2 require a record person in charge. However, there are few conferences with a dedicated record person in charge, and, in many cases, a speaker also serves as the record person in charge. Therefore, when lively discussion is conducted, there is a problem that the conference may be advanced, without the contents of proceeding of the conference being recorded. Further, there is a problem that data volume increases since voice data is recorded.

An exemplary advantage according to the invention is that data volume can be reduced and forgetting to write the contents of proceedings can be suppressed.

A fifth exemplary embodiment of the invention is an electronic conference device including any aspect of the minutes making assistance device.

Furthermore, a sixth exemplary embodiment of the invention is an electronic conference system including the electronic conference device including any aspect of the minutes making assistance device, wherein a plurality of communication terminals are connected to the electronic conference device through a communication network.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. A minutes making assistance device, comprising:
a sound input device;
a display device;
a user input device; and
a computer device, in communication with the sound input device and the display device, and equipped with a processor device, a memory, and a storage device, the memory having stored therein processor-readable code that, upon execution by the processor device, causes the computer device to function as:
 a sound processing unit that performs processing regarding a voice detected by the sound input device and determines whether or not speaking is started,
 an operation processing unit that performs processing regarding an operation and determines whether or not the operation is performed via the user input device,
 a display processing unit that performs processing regarding the display device, and
 a control unit that
  stores speaking start time and warning time in the memory when the sound processing unit determines that the speaking is started,
  performs warning processing when a current time becomes the warning time, and
  terminates the processing when the operation processing unit determines that the operation is performed before the warning time.

2. The minutes making assistance according to claim 1, wherein the operation processing unit determines that the operation is performed, when the operation of inputting a character via the user input device is performed.

3. The minutes making assistance device according to claim 1, wherein the code is further configured to cause the computer device to function as:
 a voice-character conversion unit that converts voice data into character data,
 wherein the control unit determines whether or not a conversion text that is the character data converted by the voice-character conversion unit from the voice data is correlated to an operation text input according to the operation of inputting a character, and terminates the processing, when it is determined that the conversion text is correlated to the operation text.

4. The minutes making assistance device according to claim 3, wherein the control unit extracts one or more words from the conversion text, determines whether or not the one or more words are correlated to the operation text, and terminates the processing when it is determined that the one or more words are correlated to the operation text.

5. The minutes making assistance device according to claim 3, wherein the sound processing unit determines that speaking is started when the voice-character conversion unit has succeeded to convert the voice data into the character data.

6. The minutes making assistance device according to claim 1, wherein the control unit determines at least either whether or not the speaking is started, or whether or not the operation is performed.

7. The minutes making assistance device according to claim 1, wherein the warning processing is any one or more selected from the group consisting of: causing an emission of an alarm, causing a change of a shape of a mouse cursor displayed on the display device, causing display on the display device of a message or an icon, causing a blinking of a part or whole of a screen of the display device, and causing a change of a color of a part or whole of the screen of the display device.

8. An electronic conference device comprising the minutes making assistance device according to claim 1.

9. An electronic conference system comprising the electronic conference device according to claim 8, wherein a plurality of communication terminals are connected to the electronic conference device through a communication network.

10. The electronic conference system according to claim 9, wherein the plurality of terminals comprises one or more selected from the group consisting of: a sound processing unit that performs processing regarding a voice and determines whether or not speaking is started, an operation processing unit that performs processing regarding an operation and determines whether or not the operation is performed, and a display processing unit that performs processing regarding a display.

11. The electronic conference system according to claim 10,
wherein the plurality of terminals further comprises a voice-character conversion unit that converts voice data into character data,
wherein the control unit determines whether or not a conversion text that is the character data converted by the voice-character conversion unit from the voice data is correlated to an operation text input according to the operation of inputting a character, and terminates the processing, when it is determined that the conversion text is correlated to the operation text.

12. A minutes making assistance method carried out by a computer device equipped with a sound input device, an operation input device, a display device, and a memory having stored therein code executable by a processor device of the computer device for operating the computer device, the method executed by the computer device comprising the steps of:

carrying out voice processing upon sound detected by the sound input device and to determine whether or not speaking is started;

determining whether or not an operation indicated by the operation input device has been performed;

performing display processing for causing messages or indications to be presented on the display device;

storing a speaking start time and a warning time in the memory when a determination in the voice processing indicates that the speaking is started;

performing warning processing when a current time becomes the warning time; and terminating the processing when a determination in the operation processing indicates that the operation is performed before the warning time.

13. A non-transitory storage medium having stored thereon a minutes making assistance program that, upon execution by a processor device of a computer equipped with a sound input device, an operation input device, a display device, a storage device, and a memory, causes the computer to execute:

carrying out voice processing upon sound detected by the sound input device and to determine whether or not speaking is started;

determining whether or not an operation indicated by the operation input device has been performed;

performing display processing for causing messages or indications to be presented on the display device;

storing a speaking start time and a warning time in the memory when a determination in the voice processing indicates that the speaking is started;

performing warning processing when a current time becomes the warning time; and terminating the processing when a determination in the operation processing indicates that the operation is performed before the warning time.

\* \* \* \* \*